US009554364B2

(12) United States Patent
Takeda et al.

(10) Patent No.: US 9,554,364 B2
(45) Date of Patent: Jan. 24, 2017

(54) COMMUNICATION SYSTEM, MOBILE STATION AND COMMUNICATION METHOD

(71) Applicant: NTT DOCOMO, INC., Tokyo (JP)

(72) Inventors: Shinya Takeda, Tokyo (JP); Itsuma Tanaka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 218 days.

(21) Appl. No.: 14/379,073

(22) PCT Filed: Apr. 5, 2013

(86) PCT No.: PCT/JP2013/060476
§ 371 (c)(1),
(2) Date: Aug. 15, 2014

(87) PCT Pub. No.: WO2013/151156
PCT Pub. Date: Oct. 10, 2013

(65) Prior Publication Data
US 2015/0023276 A1 Jan. 22, 2015

(30) Foreign Application Priority Data
Apr. 6, 2012 (JP) ................. 2012-087943

(51) Int. Cl.
*H04W 72/04* (2009.01)
*H04W 76/02* (2009.01)
(Continued)

(52) U.S. Cl.
CPC ............ *H04W 72/04* (2013.01); *H04L 65/103* (2013.01); *H04L 65/104* (2013.01);
(Continued)

(58) Field of Classification Search
CPC .... H04W 72/04; H04W 80/04; H04W 76/022; H04W 76/027; H04W 88/16; H04W 48/18; H04L 65/103; H04L 65/104; H04L 65/1016
(Continued)

(56) References Cited

U.S. PATENT DOCUMENTS

2005/0047364 A1* 3/2005 Matsukura ............. H04B 7/155
370/328
2012/0014354 A1 1/2012 Dwyer et al.

FOREIGN PATENT DOCUMENTS

| JP | 2005-94228 A | 4/2005 |
| JP | 2009-253561 A | 10/2009 |
| JP | 2010-45428 A | 2/2010 |

OTHER PUBLICATIONS

3GPP TS 24.229 V11.2.1; "3rd Generation Partnership Project; Technical Specification Group Core Network and Terminals; IP multimedia call control protocol based on Session Initiation Protocol (SIP) and Session Description Protocol (SDP); Stage 3 (Release 11);" Jan. 2012 (716 pages).
(Continued)

*Primary Examiner* — Obaidul Huq
(74) *Attorney, Agent, or Firm* — Osha Liang LLP

(57) ABSTRACT

Provided are a communication system, a mobile station and a communication method that can suppress the increase of processing loads of an IP-CAN accompanying trials made by mobile stations to connect to the IP-CAN via a wireless access network that does not support any services on the IP multimedia core network subsystem (IMS). For example, a UE (100) receives, from an SGSN via the 3G, service non-supporting information indicating that the 3G does not support any services on the IP multimedia subsystem, and, when having received the service non-supporting informa-
(Continued)

tion, stops the transmission of an Activate PDP Context Request via the 3G.

5 Claims, 7 Drawing Sheets

(51) Int. Cl.
*H04L 29/06* (2006.01)
*H04W 80/04* (2009.01)
*H04W 48/18* (2009.01)
*H04W 88/16* (2009.01)

(52) U.S. Cl.
CPC ....... *H04L 65/1016* (2013.01); *H04W 76/022* (2013.01); *H04W 80/04* (2013.01); *H04W 48/18* (2013.01); *H04W 76/027* (2013.01); *H04W 88/16* (2013.01)

(58) Field of Classification Search
USPC ............... 370/229, 230, 276, 282, 310, 328, 329,370/351, 389, 395.1, 395.2, 395.5
See application file for complete search history.

(56) References Cited

OTHER PUBLICATIONS

3GPP TS 23.228 V11.3.0; "3rd Generation Partnership Project; Technical Specification Group Services and System Aspects; IP Multimedia Subsystem (IMS); Stage 2 (Release 11);" Dec. 2011 (278 pages).
3GPP TS 24.301 V9.9.0; "3rd Generation Partnership Project; Technical Specification Group Core Network and Terminals; Non-Access-Stratum (NAS) protocol for Evolved Packet System (EPS); Stage 3 (Release 9);" Mar. 2012 (300 pages).
3GPP TS 24.008 V11.2.1; "3rd Generation Partnership Project; Technical Specification Group Core Network and Terminals; Mobile radio interface Layer 3 specification; Core network protocols; Stage 3 (Release 11);" Mar. 2012 (659 pages).
GSMA IR. 92; "IMS Profile for Voice and SMS;" Version 7.0; Mar. 3, 2013 (32 pages).
Office Action for Japanese Application No. 2012-087943, mailed May 14, 2013 (4 pages).
International Search Report for corresponding International Application No. PCT/JP2013/060476, mailed May 21, 2013 (2 pages).
Written Opinion for corresponding International Application No. PCT/JP2013/060476, mailed May 21, 2013 (3 pages).
Extended Search Report issued in corresponding European Application No. 13772663.4, mailed Nov. 27, 2015 (9 pages).
3GPP TS 24.229 V11.3.0; "3rd Generation Partnership Project; Technical Specification Group Core Network and Terminals; IP multimedia call control protocol based on Session Initiation Protocol (SIP) and Session Description Protocol (SDP); Stage 3(Release 11)"; Mar. 2012 (728 pages).
NTT DOCOMO; "Discussion summary on Video Domain Selection for MO Case"; 3GPP TSG SA WG2 Meeting #88_3GPP TSG CT WG1 Meeting #75, S2-114786_C1-114630; San Francisco, USA; Nov. 14-18, 2011 (24 pages).

* cited by examiner

COMMUNICATION SYSTEM, MOBILE STATION AND COMMUNICATION METHOD

TECHNICAL FIELD

The present invention relates to a communication system, a mobile station and a communication method, which are capable of connecting to an access network following Internet protocols.

BACKGROUND ART

In Long Term Evolution (LTE), a scheme is specified in which a mobile station (UE) carries out LTE voice calls (VoLTE) and the like by establishing an IP-CAN Bearer (SIP bearer), which is a logical communication path for Session Initiation Protocol (SIP) and voice media, on an IP-Connectivity Access Network (IP-CAN). IP-CAN is an IP access network providing a function to transport SIP and voice media (see, for example, Non-patent document 1)

It is also specified that the mobile station executes procedures for connection to the IP-CAN when the IP-CAN Bearer is released for some reason (for example, handover of the mobile station to UTRAN (3G)/GERAN (2G), an overload state on the network side, or the like) (see, for example, Non-patent document 2).

FIG. 1 shows a communication sequence in a case where, after the mobile station establishes an IP-CAN Bearer via E-UTRAN (LTE), the mobile station performs handover (transition) to another radio access network UTRAN/GERAN and thereby the IP-CAN Bearer is released. As shown in FIG. 1, when the mobile station executes handover to UTRAN/GERAN (S10), the IP-CAN Bearer is released (removal) (S20). Then, after the execution of the handover, the mobile station executes procedures for connection to the IP-CAN (S30).

PRIOR ART DOCUMENT

Non-Patent Document

Non-patent document 1: 3GPP TS 24.229 V11.2.1, 3rd Generation Partnership Project; Technical Specification Group Core Network and Terminals; IP multimedia call control protocol based on Session Initiation Protocol (SIP) and Session Description Protocol (SDP); Stage 3 (Release 11), January 2012

Non-patent document 2: 3GPP TS 23.228 V11.3.0, 3rd Generation Partnership Project; Technical Specification Group Services and System Aspects; IP Multimedia Subsystem (IMS); Stage 2 (Release 11), December 2011

SUMMARY OF THE INVENTION

The IP-CAN may be configured of a radio access network (for example, LTE) that supports a service (for example, voice calls using SIP and a Short Message Service using IP) on IP Multimedia core network Subsystem (IMS) including a Policy and Charging Rules Function (PCRF), a Proxy-Call Session Control Function (P-CSCF) and the like, and may also be configured of an IP access network (for example, 3G) that does not support the service on the IMS.

However, even when the mobile station performs handover to an IP-CAN configured of a radio access network not supporting the service, the mobile station tries to establish the IP-CAN Bearer by always executing the procedures for connection to the IP-CAN irrespective of whether the IP-CAN supports the service on the IMS or not. For this reason, there is a possibility that the repeated connection procedures to the IP-CAN that does not support the INS wastefully increases processing load of the IP-CAN.

Therefore, the present invention has been made in consideration of the above circumstances. It is an objective of the present invention to provide a communication system, a mobile station and a communication method, which can suppress an increase in processing load of an IP-CAN accompanying trials made by mobile stations to connect to the IP-CAN via a radio access network that does not support any services on the IP Multimedia core network Subsystem (IMS).

A first feature of the present invention is summarized as a communication system including: a mobile station capable of connecting to an IP access network following Internet protocols via either a first radio access network that supports services on an IP multimedia subsystem following Internet protocols or a second radio access network that does not support the services on the IP multimedia subsystem; and an exchange capable of communicating with the IP multimedia subsystem, wherein the exchange includes an information notification unit configured to transmit service non-supporting information to the mobile station, the service non-supporting information indicating that the second radio access network does not support the services, the mobile station includes a bearer establishment unit configured to transmit a bearer establishment request to the IP access network, the bearer establishment request requesting establishment of a bearer that is a logical communication path between the mobile station and a gateway device included in the IP access network, and an information receiving unit configured to receive the service non-supporting information from the exchange via the second radio access network, and the bearer establishment unit stops the transmission of the bearer establishment request via the second radio access network when the information receiving unit receives the service non-supporting information.

A second feature of the present invention is summarized as a mobile station capable of connecting to an IP access network following Internet protocols via either a first radio access network that supports services on an IP multimedia subsystem following Internet protocols or a second radio access network that does not support the services on the IP multimedia subsystem, including: a bearer establishment unit configured to transmit a bearer establishment request to the IP access network, the bearer establishment request requesting establishment of a bearer that is a logical communication path between the mobile station and a gateway device included in the IP access network; and an information receiving unit configured to receive service non-supporting information from an exchange via the second radio access network, the service non-supporting information indicating that the second radio access network does not support the services, wherein the bearer establishment unit stops the transmission of the bearer establishment request via the second radio access network when the information receiving unit receives the service non-supporting information.

A third feature of the present invention is summarized as a communication method executed by a mobile station capable of connecting to an IP access network following Internet protocols via either a first radio access network that supports services on an IP multimedia subsystem following Internet protocols or a second radio access network that does not support the services on the IP multimedia subsystem, and an exchange capable of communicating with the IP multimedia subsystem, the method comprising the steps of:

transmitting service non-supporting information from the exchange to the mobile station, the service non-supporting information indicating that the second radio access network does not support the services; transmitting a bearer establishment request from the mobile station to the IP access network, the bearer establishment request requesting establishment of a bearer that is a logical communication path between the mobile station and a gateway device included in the IP access network; receiving the service non-supporting information at the mobile station from the exchange via the second radio access network; and stopping, by the mobile station, the transmission of the bearer establishment request via the second radio access network upon receipt of the service non-supporting information from the exchange.

MODE FOR CARRYING OUT THE INVENTION

Figure 1:
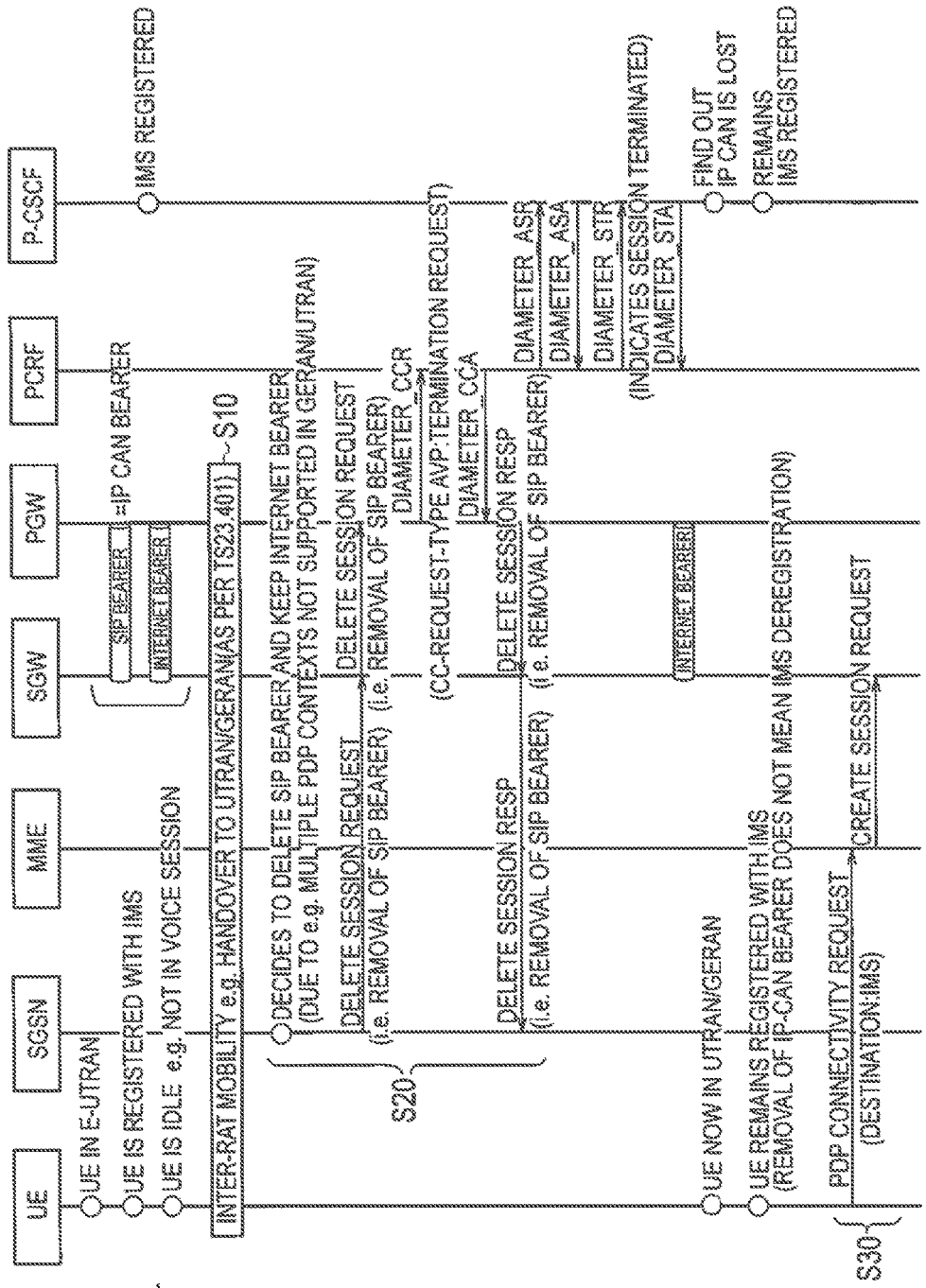
FIG. 1 is a communication sequence diagram when an IP-CAN Bearer is released in a conventional mobile communication system.

Hereinafter, embodiments of the present invention will be described. Note that, in the following description of the drawings, same or similar reference numerals denote same or similar elements and portions. In addition, it should be noted that the drawings are schematic and ratios of dimensions and the like in the drawings are different from actual ones.

Therefore, specific dimensions and the like should be determined in consideration of the following description. Moreover, as a matter of course, the drawings include portions having different dimensional relationships and ratios from each other.

(1) Overall Schematic Configuration of Mobile Communication System

Figure 2:
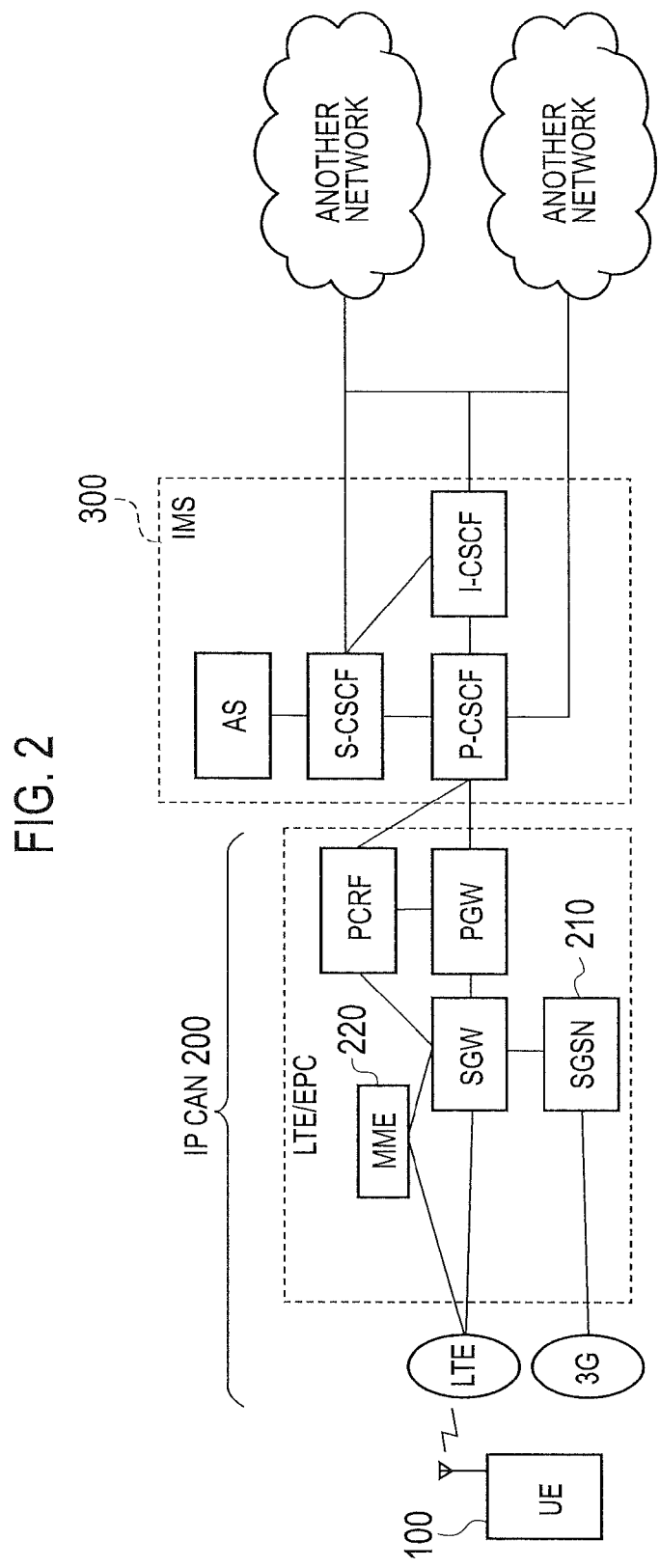
FIG. 2 is an overall schematic configuration diagram of a mobile communication system according to an embodiment of the present invention.

FIG. 2 is an overall schematic configuration diagram of a mobile communication system 10 according to this embodiment. As shown in FIG. 2, the mobile communication system 10 includes a mobile station 100 (hereinafter the UE 100), an IP-Connectivity Access Network 200 (hereinafter the IP-CAN 200) and an IP Multimedia core network Subsystem 300 (hereinafter the IMS 300).

In this embodiment, the UE 100 can execute radio communication according to the Long Term Evolution (LTE) and 3G (W-CDMA). The UE 100 can connect to the IP-CAN 200 according to the LTE or 3G. Also, the UE 100 executes its own Registration with the IMS 300 via the IP-CAN 200. For example, the UE 100 can execute its own registration with the IMS 300 according to Registration procedures specified in Section 5.1.1.1 or Section L3.1.2 of 3GPP TS 24.229.

The LTE (E-UTRAN) is a radio access network that supports services on the IMS 300, and constitutes a first radio access network in this embodiment. Meanwhile, the 3G (UTRAN) is a radio access network that does not support any services on the IP multimedia subsystem, and constitutes a second radio access network in this embodiment. The UE 100 can connect to the IP-CAN 200 via either the LTE or the 3G.

The IP-CAN 200 is an IP access network following Internet protocols (IP). Specifically, the IP-CAN 200 is a network that provides a transport function of a Session Initiation Protocol (SIP) and voice media, and corresponds to an LTE/Evolved Packet Core (EPC) network in this embodiment.

The IP-CAN 200 includes a Mobility Management Entity (MME), a Serving Gateway (SGW), a Packet Data Network Gateway (PGW), a Policy and Charging Rules Function (PCRF) and an SGSN (Serving GPRS Support Node) 210 (exchange). Note that the UE 100 and the SGSN 210 constitute a communication system in this embodiment.

The MME 220 is an exchange that accommodates an eNodeB (radio base station) and provides functions of mobility control, bearer control, and the like. The SGW is a packet exchange located within a zone, which accommodates a 3GPP (LTE) access system. The PGW is a connection point with the IMS base, and is a packet exchange that performs IP address assignment, packet transfer to the SGW, and the like. Also, the PGW works with the PCRF to execute QoS control, bearer setting control, and the like. The PCRF is a logical node that executes control for QoS of user data transfer and charging. The SGSN 210 is a packet exchange that accommodates a UTRAN (3G) access system.

The IMS 300 is a multimedia subsystem following Internet protocols, and includes a Proxy-Call Session Control Function (P-CSCF), an Interrogating-Call Session Control Function (I-CSCF), a Serving-Call Session Control Function (S-CSCF) and an Application Server (AS).

The P-CSCF is an SIP relay server deployed at a connection point with the EPC, and has not only a SIP transfer function but also functions to start QoS control and to recognize the state of an IP-CAN Bearer in collaboration with the EPC (PCRF). Moreover, other networks (such as a fixed telephone network) are connected to the IMS 300.

(2) Functional Block Configuration of Communication System

Next, description is given of functional block configurations of the UE 100, SGSN 210 and MME 220, which are included in the communication system in this embodiment.

(2.1) SGSN 210 and MME 220

Figure 3:
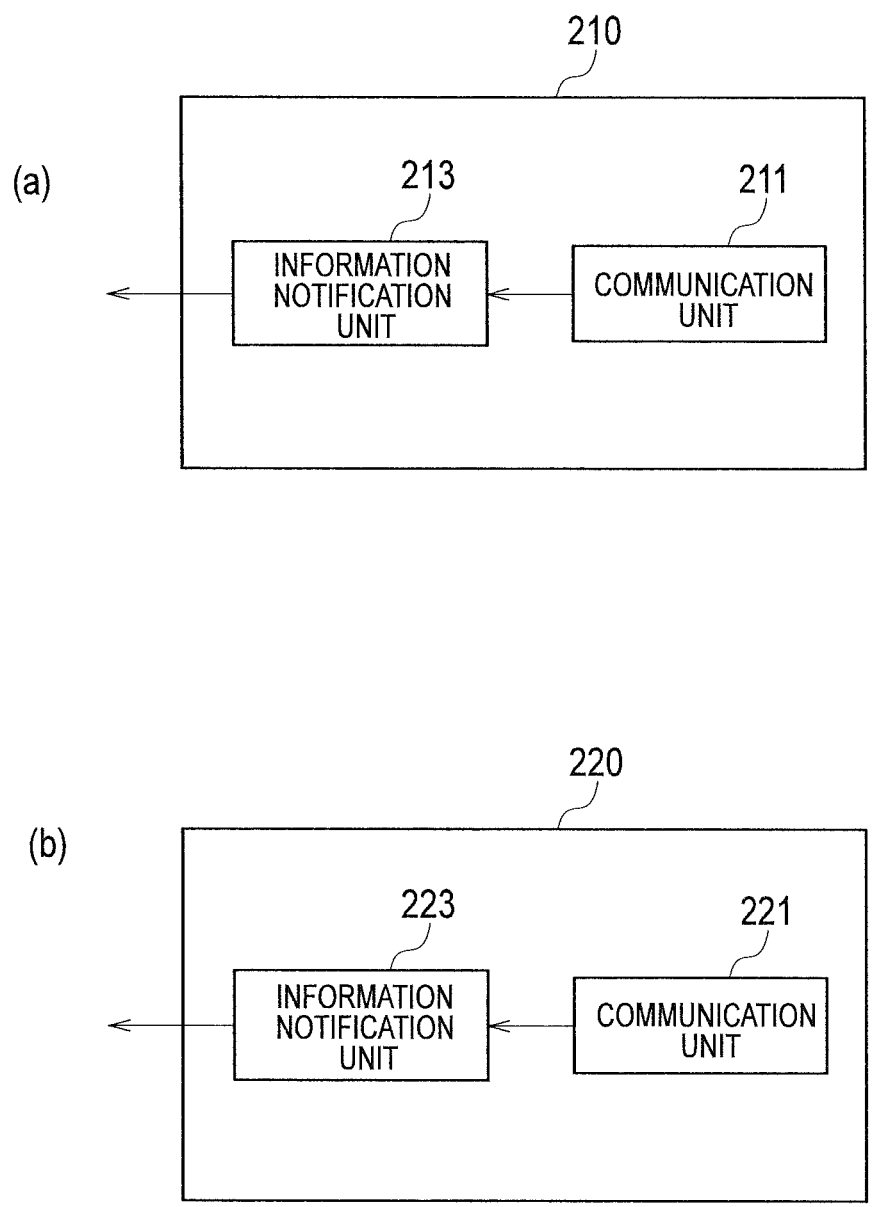
FIG. 3 is a functional block configuration diagram of an SGSN 210 and an MME 220 according to the embodiment of the present invention.

FIG. 3(a) is a functional block configuration diagram of the SGSN 210, and FIG. 3(b) is a functional block configuration diagram of the MME 220. The SGSN 210 is an exchange capable of communicating with the INS 300, and includes a communication unit 211 and an information notification unit 213 as shown in FIG. 3(*a*). Meanwhile, the MME 220 is an exchange capable of communicating with the IMS 300, and includes a communication unit 221 and an information notification unit 223 as shown in FIG. 3(*b*).

The communication unit 211 executes communication with the SGW included in the IP-CAN 200 and with the devices included in the IMS 300. Particularly, in this embodiment, when the UE 100 connects to the IP-CAN 200 via the UTRAN, the communication unit 211 can acquire, from the SGW or the like, information indicating that services on the IMS 300 are not supported, and can also store such information. Note that such services include voice calls (VoLTE), a Short Message Service (SMS over IP), RCS (Rich Communication Suite), and the like.

The information notification unit 213 notifies the UE 100 of various kinds of information. Particularly, in this embodiment, the information notification unit 213 transmits to the UE 100 service non-supporting information indicating that the 3G is not compatible with (does not support) any services on the IMS 300. Specifically, the information notification unit 213 transmits to the UE 100 an Information Element (IE) including IMS=not supported indicating that the 3G does not support any services on the IMS 300. Messages (Primitive) including the IE include responses to position registration from the UE 100, such as an Attach Accept to be transmitted to the UE 100 as a response to an Attach Request transmitted from the UE 100 and a Routing Area Update (RAU) Accept to be transmitted to the UE 100 as a response to a Routing Area Update Request transmitted from the UE 100.

Each of such messages includes, as the IE, an IMS supported indicator indicating whether or not the IP-CAN 200 using the radio access network to which the UE 100 is connected supports the services on the IMS 300. The IMS supported indicator can indicate IMS=not supported indicating that the services are not supported, as described above. Note that it is just an example to use IMS=not supported to indicate that the services are not supported. Besides IMS=not supported, IMS=supported may be transmitted when the services are supported, or no INS supported indicator itself may be transmitted when the services are not supported.

In other words, the IMS supported indicator notifies whether or not the IP-CAN 200 has an ability to provide an SIP Signaling bearer dedicated to the IMS 300.

Operation modes of the functional blocks in the MME 220 are approximately the same as those in the SGSN 210. More specifically, the communication unit 211 may perform operations corresponding to those of the communication unit 221, and the information notification unit 213 may perform operations corresponding to those of the information notification unit 223. In this case, the Routing Area Update (RAU) and Routing Area Update Accept are read as Tracking Area Update (TAU) and Tracking Area Update Accept, respectively.

(2.2) UE 100

Figure 4:
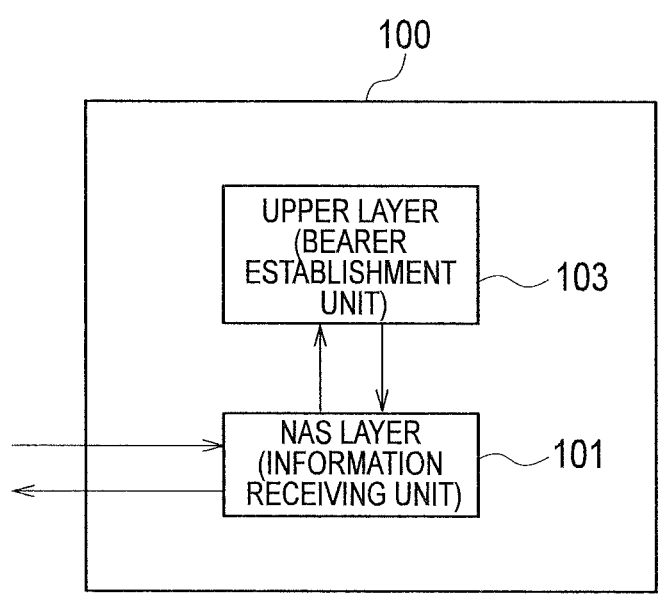
FIG. 4 is a functional block configuration diagram of a UE 100 according to the embodiment of the present invention.

FIG. 4 is a functional block configuration diagram of the UE 100. As shown in FIG. 4, the UE 100 includes a Non-Access-Stratum layer 101 (hereinafter the NAS layer 101) and an upper layer 103.

The NAS layer 101 receives the service non-supporting information from the SGSN 210. The upper layer 103 is, specifically, an IMS application to set the IMS 300 in a Deregistered state based on the IMS supported indicator (IMS=not supported) received from the NAS layer 101. More specifically, the use of the services on the IMS 300 is stopped when the upper layer 103 sets the IMS 300 in the Deregistered state. Alternatively, the upper layer 103 may set the IMS 300 in the Deregistered state when having determined that SIP synchronization is lost for some reason (for example, by timer-controlled monitoring of SIP synchronization) after the receipt of the IMS supported indicator (IMS=not supported).

In this embodiment, the NAS layer 101 constitutes an information receiving unit configured to receive the IMS supported indicator from the SGSN 210.

Also, the upper layer 103 constitutes a bearer establishment unit configured to transmit an Activate PDP Context Request (bearer establishment request) to the IP-CAN 200, more specifically, to the SGSN 210. The Activate PDP Context Request is a request to establish an IP-CAN Bearer that is a logical communication path between the UE 100 and a PGW (gateway device) included in the IP-CAN 200. The upper layer 103 stops the transmission of the bearer establishment request via the 3G when the NAS layer 101 receives the IMS supported indicator (IMS=not supported).

In this embodiment, the upper layer 103 stops the transmission of the bearer establishment request until the UE 100 is enabled to use services on the LTE, i.e., the IMS 300 by being attached to a radio access network that supports the services. Since the upper layer 103 operates as described above, the NAS layer 101 continues to stop the transmission of the IP-CAN Bearer establishment request until a message related to a response to position registration, specifically, an Attach/RAU Accept/TAU Accept indicates that the services on the IMS 300 are supported, due to a change in the radio access network (RAT) to which the UE 100 is attached, or the like.

(3) Operations of Communication System

Next, description is given of operations of the mobile communication system 10 described above. Specifically, description is given of an operation flow of stopping the IP-CAN Bearer establishment request by the UE 100, and an IP-CAN Bearer establishment request sequence by the UE 100 and the SGSN 210.

(3.1) Operation Flow of Stopping IP-CAN Bearer Establishment Request by UE 100

Figure 5:
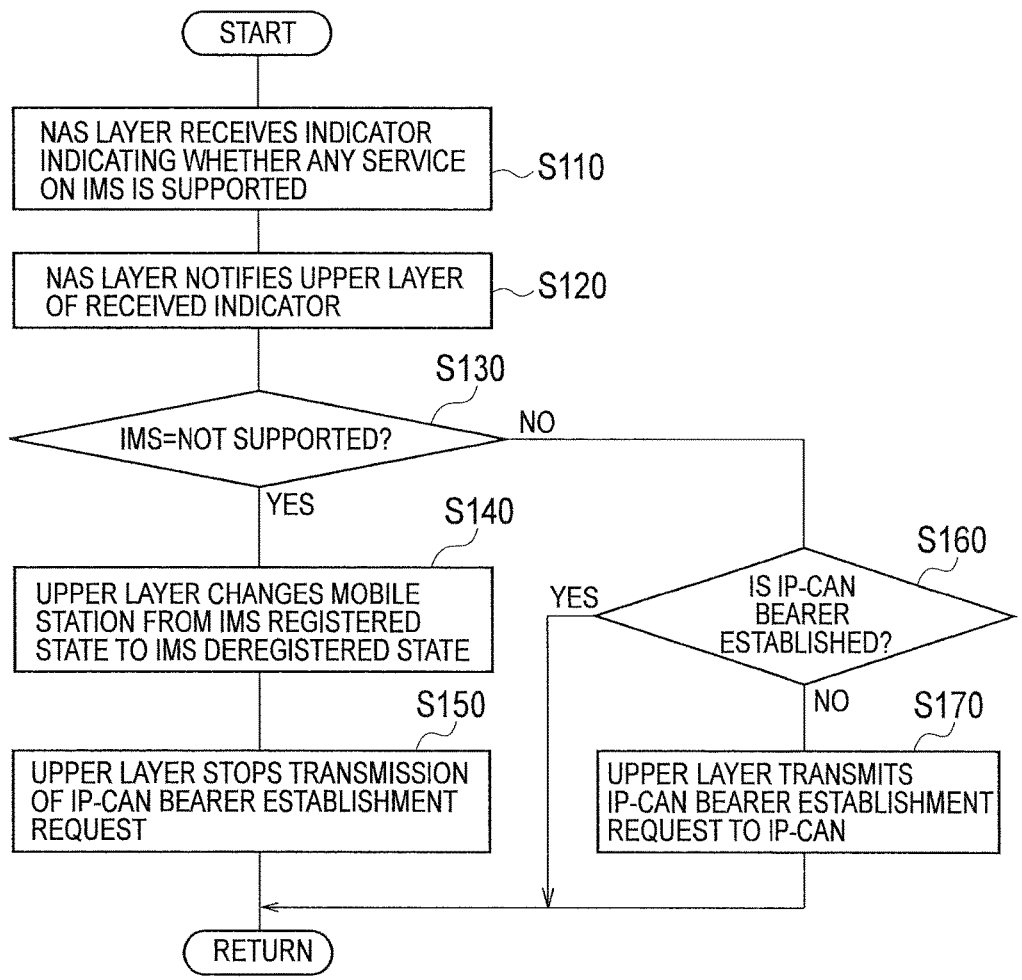
FIG. 5 is a flowchart showing an operation of stopping an IP-CAN Bearer establishment request by the UE 100 according to the embodiment of the present invention.

FIG. 5 shows the operation flow of stopping an IP-CAN Bearer establishment request by the UE 100. As shown in FIG. 5, the NAS layer 101 in the UE 100 receives a message including an IMS supported indicator indicating whether or not services on the IMS 300 are supported (S110). Then, the NAS layer 101 notifies the upper layer 103 of the received IMS supported indicator (S120).

The upper layer 103 determines whether or not the received IMS supported indicator is IMS=not supported (S130).

If IMS=not supported, the upper layer 103 changes the UE 100 from an IMS Registered state to an IMS Deregistered state (S140). Note that this operation is not essential as described above.

Thereafter, the upper layer 103 stops the transmission of the IP-CAN Bearer establishment request (S150). Specifically, the upper layer 103 continues to stop the transmission of the IP-CAN Bearer establishment request until the IE indicates that the services on the IMS 300 are supported, due to a change in the radio access network to which the UE 100 is attached, or the like.

On the other hand, if IMS=supported, the upper layer 103 determines whether or not the IP-CAN Bearer has already been established (S160). When no IP-CAN Bearer is established via the radio access network to which the UE 100 is attached, the upper layer 103 transmits an IP-CAN Bearer establishment request to the IP-CAN 200 (for example, the MME 220) (S170).

(3.2) IP-CAN Bearer Establishment Request Sequence by UE 100 and SGSN 210

Figure 6:
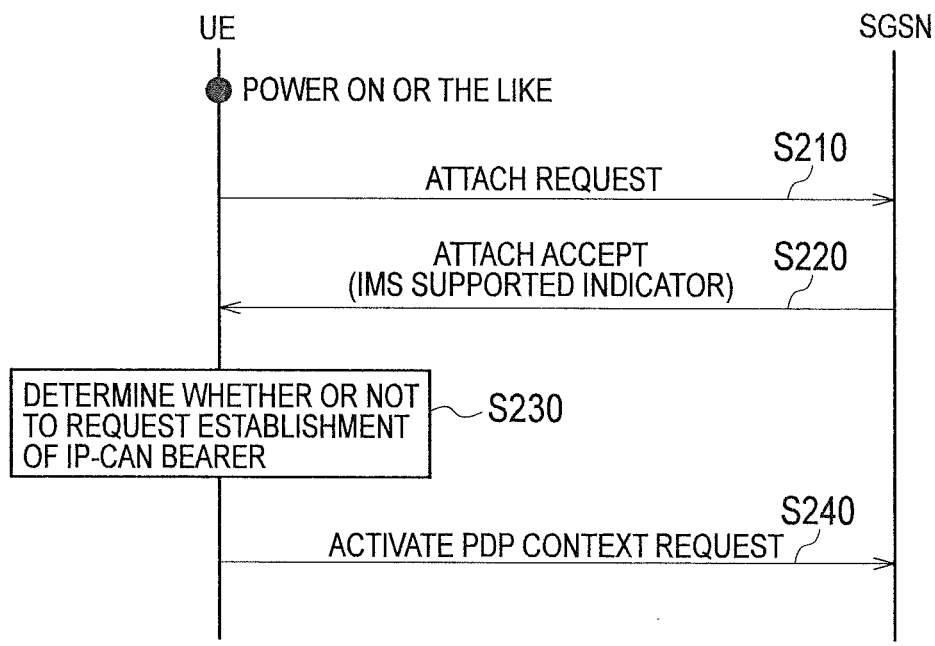
FIG. 6 is an IP-CAN Bearer establishment request sequence diagram in a case where the UE 100 is turned on according to the embodiment of the present invention.

FIG. 6 shows the IP-CAN Bearer establishment request sequence in such a case as where the UE 100 is turned on.

As shown in FIG. 6, the UE 100, when turned on, transmits an Attach request to request attachment to the 3G (S210). The SGSN 210 transmits to the UE 100 an Attach Accept that is a response to the Attach Request (S220). The Attach Accept includes an IMS supported indicator, as described above.

Upon receipt of the Attach Accept, the UE 100 determines whether or not to request establishment of an IP-CAN Bearer, based on the IMS supported indicator (S230). More specifically, the UE 100 determines whether or not to request establishment of an IP-CAN Bearer, based on the operation flow shown in FIG. 5 described above.

When requesting the establishment of the IP-CAN Bearer, the UE 100 transmits an Activate PDP Context Request to the SGSN 210 (S240).

Figure 7:
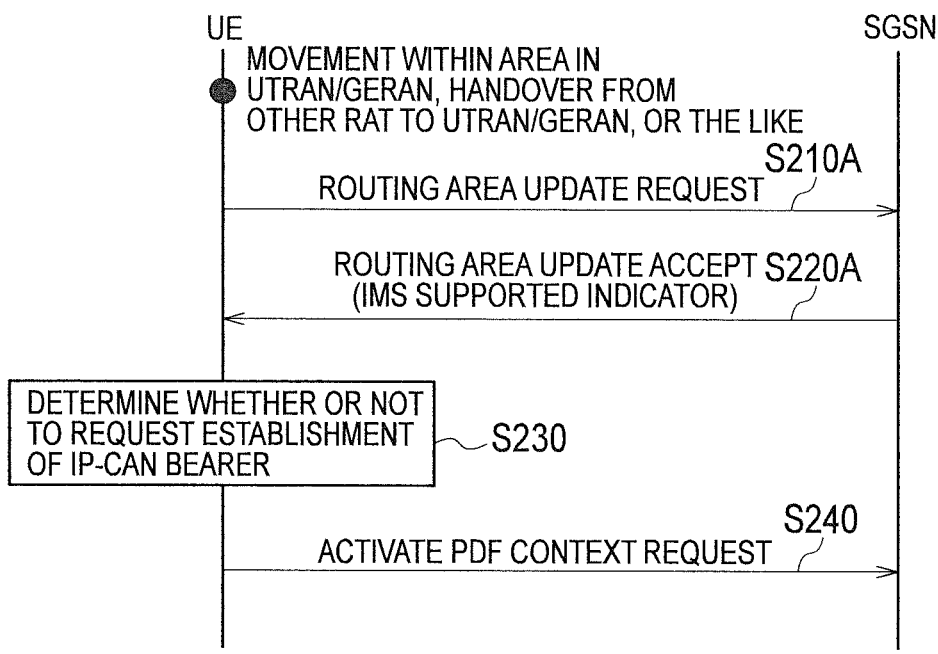
FIG. 7 is an IP-CAN Bearer establishment request sequence diagram in a case where the UE 100 moves (such as handover) within an area in UTRAN (or GERAN) or the UE 100 shifts from the other radio access network (RAT) to the UTRAN (or GERAN).

FIG. 7 shows an IP-CAN Bearer establishment request sequence in such a case as where the UE 100 moves (such as handover) within an area in UTRAN (or GERAN) or where the UE 100 shifts from the other radio access network (RAT) to the UTRAN (or GERAN).

As shown in FIG. 7, the UE 100 transmits a Routing Area Update Request to request updating of a routing area in response to movement within the area in UTRAN or the like (S210A). The SGSN 210 transmits to the UE 100 a Routing Area Update Accept that is a response to the Routing Area Update Request (S220A). The Routing Area Update Accept includes an INS supported indicator as described above. Subsequent processing of S230 and S240 is the same as that in the case of FIG. 6.

(4) Advantageous Effects

According to the UE 100 and the SGSN 210 described above, the IE including the IMS supported indicator indicating that the 3G does not support any services on the INS 300 is transmitted from the SGSN 210 to the UE 100. Upon receipt of the IMS supported indicator (IMS=not supported) indicating that the services on the IMS 300 are not supported, the UE 100 stops the transmission of the bearer establishment request via the 3G.

Thus, when the UE 100 receives the IMS supported indicator (IMS=not supported), the transmission of the bearer establishment request is immediately stopped. This means that communication related to the IP-CAN Bearer establishment request is prevented from occurring despite the fact that the services on the IMS 300 are not supported. As a result, an increase in processing load of the IP-CAN 200 can be effectively suppressed. Particularly, when the UE 100 receives the IMS supported indicator (IMS=not supported), the transmission of the bearer establishment request is completely stopped. Thus, transmission of unnecessary bearer establishment requests can be surely suppressed.

Note that an IE indicating whether or not the radio access network supports voice communication (IMS voice) on the IMS 300 is specified in 3GPP technical standards (IMS voice over PS session indicator in TS 24.301 Subclause 9.9.3.12A and INS voice over PS session indicator in TS 24.008 Subclause 10.5.5.23). However, the IE is specified only for voice calls, and when the voice communication is not supported, nothing more than execution of voice calls via a call switching (CS) domain is specified. In other words, nothing is specified for handling of the IP-CAN Bearer.

Moreover, in this embodiment, the UE 100 can stop the transmission of the bearer establishment request until the UE 100 is enabled to use the services on the IMS 300 by being attached to the LTE. Thus, transmission of unnecessary bearer establishment requests can be more surely suppressed.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, in the embodiment of the present invention described above, the description has been given assuming that the 3G does not support any services on the IMS 300. However, the present invention is also similarly applicable to the case where the LTE does not support any services on the IMS 300.

Figure 8:
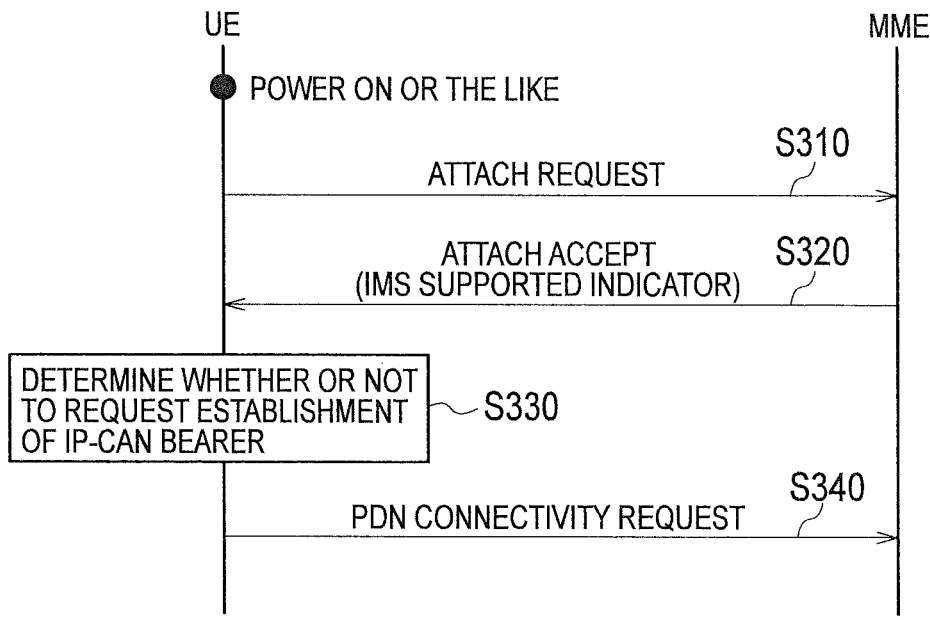
FIG. 8 is an IP-CAN Bearer establishment request sequence diagram in a case where a UE 100 is turned on according to a modified example of the present invention.
Figure 9:
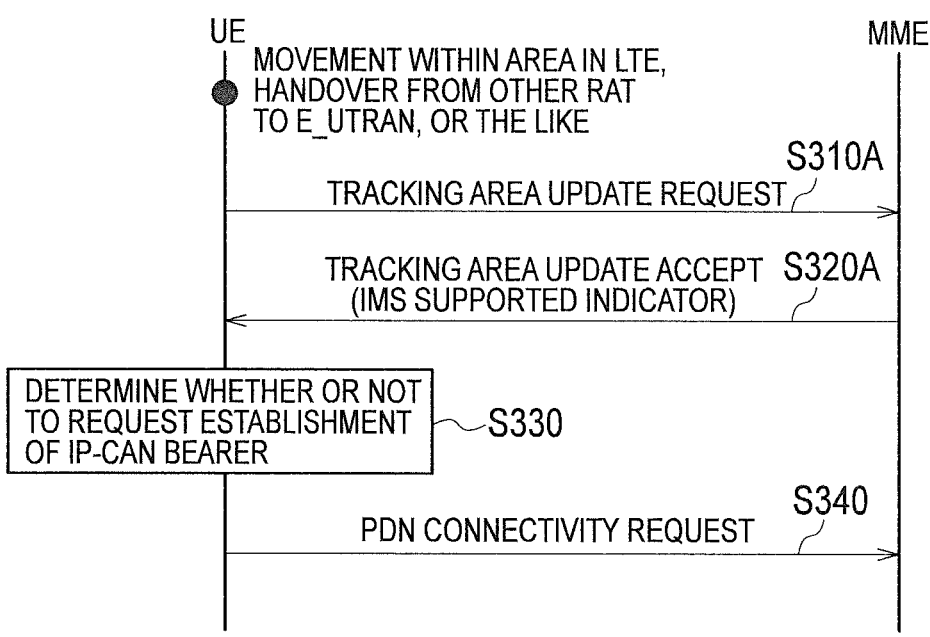
FIG. 9 is an IP-CAN Bearer establishment request sequence diagram in a case where the UE 100 moves (such as handover) within an area in LTE or where the UE 100 shifts from the other radio access network (RAT) to E-UTRAN.

FIGS. 8 and 9 correspond to FIGS. 6 and 7 described above, respectively. FIG. 8 shows an IP-CAN Bearer establishment request sequence in such a case as where a UE 100 is turned on according to a modified example of the present invention. FIG. 9 shows an IP-CAN Bearer establishment request sequence in such a case as where the UE 100 moves (such as handover) within an area in LTE or where the UE 100 shifts from the other radio access network (RAT) to E-UTRAN.

In the case of the modified example shown in FIG. 8, an MME 220, instead of an SGSN 210, transmits and receives an Attach Request and an Attach Accept (S310 and S320). Meanwhile, in the case of the modified example shown in FIG. 9, an MME 220 transmits and receives a Tracking Area Update Request and a Tracking Area Update Accept (S310A and S320A). The Tracking Area Update Accept includes an IMS supported indicator. Note that processing by the UE 100 in S330 shown in FIGS. 8 and 9 is the same as that in S230 shown in FIGS. 6 and 7. Although processing by the UE 100 in S340 is also approximately the same as that in S240 shown in FIGS. 6 and 7, a message (Primitive) to be used is a PDN Connectivity Request.

Alternatively, the MME 220 may use the IMS supported indicator to notify that the services on the IMS 300 are supported.

Moreover, although the UE 100 include the NAS layer 101 and the upper layer 103 in the embodiment described above, such a configuration is not necessarily essential. For example, the upper layer 103 may include the functions of the information receiving unit and the bearer establishment unit.

Note that the present invention described above may be represented as follows. A first feature of the present invention is summarized as the mobile communication system 10 (communication system) including: the UE 100 (mobile station) capable of connecting to the IP-CAN 200 (IP access network) following Internet protocols via either the first radio access network that supports services on the IMS 300 (IP multimedia subsystem) following Internet protocols or the second radio access network that does not support the services on the IP multimedia subsystem; and the exchange (SGSN 210 or MME 220) capable of communicating with the IP multimedia subsystem, wherein the exchange includes the information notification unit 213 (information notification unit) configured to transmit service non-supporting information to the mobile station, the service non-supporting information indicating that the second radio access network does not support the services, the mobile station includes the upper layer 103 (bearer establishment unit) configured to transmit the Activate PDP Context Request or the PDN Connectivity Request (bearer establishment request) to the IP access network, the bearer establishment request requesting establishment of the IP-CAN Bearer (bearer) that is the logical communication path between the mobile station and the PGW (gateway device) included in the IP access network, and the NAS layer 101 (information receiving unit) configured to receive the service non-supporting information from the exchange via the second radio access network, and the bearer establishment unit stops the transmission of the bearer establishment request via the second radio access network when the information receiving unit receives the service non-supporting information.

A second feature of the present invention is summarized as the mobile station capable of connecting to the IP access network following Internet protocols via either the first radio access network that supports services on the IP multimedia subsystem following Internet protocols or the second radio access network that does not support the services on the IP multimedia subsystem, including: the bearer establishment unit configured to transmit the bearer establishment request to the IP access network, the bearer establishment request requesting establishment of the bearer that is the logical communication path between the mobile station and the gateway device included in the IP access network; and the information receiving unit configured to receive service non-supporting information from the exchange via the second radio access network, the service non-supporting information indicating that the second radio access network does not support the services, wherein the bearer establishment unit stops the transmission of the bearer establishment request via the second radio access network when the information receiving unit receives the service non-supporting information.

In the second feature of the present invention, the bearer establishment unit may stop the transmission of the bearer establishment request until the mobile station is enabled to use the services by being attached to the first radio access network.

Moreover, in the second feature of the present invention, the information receiving unit may be configured using the NAS layer configured to receive the service non-supporting information from the exchange, and the bearer establishment unit may be configured using the upper layer configured to set the IP multimedia subsystem in the Deregistered state based on the service non-supporting information received from the NAS layer.

A third feature of the present invention is summarized as the communication method executed by the mobile station capable of connecting to the IP access network following Internet protocols via either the first radio access network that supports services on the IP multimedia subsystem following Internet protocols or the second radio access network that does not support the services on the IP multimedia subsystem, and the exchange capable of communicating with the IP multimedia subsystem, the method comprising the steps of: transmitting service non-supporting information from the exchange to the mobile station, the service non-supporting information indicating that the second radio access network does not support the services; transmitting the bearer establishment request from the mobile station to the IP access network, the bearer establishment request requesting establishment of the bearer that is the logical communication path between the mobile station and the gateway device included in the IP access network; receiving the service non-supporting information at the mobile station from the exchange via the second radio access network; and stopping, by the mobile station, the transmission of the bearer establishment request via the second radio access network upon receipt of the service non-supporting information from the exchange.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2012-087943 (filed on Apr. 6, 2012) is incorporated by reference in the present specification.

INDUSTRIAL APPLICABILITY

The present invention can provide a communication system, a mobile station and a communication method, which can suppress an increase in processing load of an IP-CAN accompanying trials made by mobile stations to connect to the IP-CAN via a radio access network that does not support any services on the IP Multimedia core network Subsystem (IMS).

EXPLANATION OF THE REFERENCE NUMERALS

10 mobile communication system
100 UE
101 NAS layer
103 upper layer
200 IP-CAN
210 SGSN
220 MME
211 communication unit
213 information notification unit
221 communication unit
223 information notification unit
300 IMS The invnetion claimed is:
1. A communication system comprising:
a mobile station capable of connecting to an IP access network following Internet protocols via either a first radio access network that supports services on an IP multimedia subsystem following Internet protocols or a second radio access network that does not support the services on the IP multimedia subsystem; and
an exchange capable of communicating with the IP multimedia subsystem, wherein
the exchange includes an information notification unit configured to transmit service non-supporting information to the mobile station, the service non-supporting information indicating that the second radio access network does not support the services,
the mobile station includes
a bearer establishment unit configured to transmit a bearer establishment request to the IP access network, the bearer establishment request requesting establishment of a bearer that is a logical communication path between the mobile station and a gateway device included in the IP access network, and an information receiving unit configured to receive the service non-supporting information from the exchange via the second radio access network, and the bearer establishment unit stops the transmission of the bearer establishment request via the second radio access network when the information receiving unit receives the service non-supporting information.

2. A mobile station capable of connecting to an IP access network following Internet protocols via either a first radio access network that supports services on an IP multimedia subsystem following Internet protocols or a second radio access network that does not support the services on the IP multimedia subsystem, comprising:

a bearer establishment unit configured to transmit a bearer establishment request to the IP access network, the bearer establishment request requesting establishment of a bearer that is a logical communication path between the mobile station and a gateway device included in the IP access network; and an information receiving unit configured to receive service non-supporting information from an exchange via the second radio access network, the service non-supporting information indicating that the second radio access network does not support the services, wherein the bearer establishment unit stops the transmission of the bearer establishment request via the second radio access network when the information receiving unit receives the service non-supporting information.

3. The mobile station according to claim 2, wherein the bearer establishment unit stops the transmission of the bearer establishment request until the mobile station is enabled to use the services by being attached to the first radio access network.

4. The mobile station according to claim 2, wherein the information receiving unit is configured using a NAS layer configured to receive the service non-supporting information from the exchange, and the bearer establishment unit is configured using an upper layer configured to set the IP multimedia subsystem in a Deregistered state based on the service non-supporting information received from the NAS layer.

5. A communication method executed by a mobile station capable of connecting to an IP access network following Internet protocols via either a first radio access network that supports services on an IP multimedia subsystem following Internet protocols or a second radio access network that does not support the services on the IP multimedia subsystem, and an exchange capable of communicating with the IP multimedia subsystem, the method comprising the steps of:

transmitting service non-supporting information from the exchange to the mobile station, the service non-supporting information indicating that the second radio access network does not support the services;

transmitting a bearer establishment request from the mobile station to the IP access network, the bearer establishment request requesting establishment of a bearer that is a logical communication path between the mobile station and a gateway device included in the IP access network;

receiving the service non-supporting information at the mobile station from the exchange via the second radio access network; and stopping, by the mobile station, the transmission of the bearer establishment request via the second radio access network upon receipt of the service non-supporting information from the exchange.

* * * * *